(12) United States Patent
Wu

(10) Patent No.: US 11,409,421 B2
(45) Date of Patent: Aug. 9, 2022

(54) OBJECT PROCESSING METHOD AND TERMINAL DEVICE

(71) Applicant: VIVO MOBILE COMMUNICATION CO., LTD., Guangdong (CN)

(72) Inventor: Zengshun Wu, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 0 days.

(21) Appl. No.: 17/506,502

(22) Filed: Oct. 20, 2021

(65) Prior Publication Data

US 2022/0043548 A1 Feb. 10, 2022

Related U.S. Application Data

(63) Continuation of application No. PCT/CN2020/080677, filed on Mar. 23, 2020.

(30) Foreign Application Priority Data

Apr. 26, 2019 (CN) .......................... 201910346516.4

(51) Int. Cl.
*G06F 3/0484* (2022.01)
*G06F 3/04817* (2022.01)
(Continued)

(52) U.S. Cl.
CPC .......... *G06F 3/0484* (2013.01); *G06F 3/0482* (2013.01); *G06F 3/04817* (2013.01); *G06F 3/0488* (2013.01)

(58) Field of Classification Search
CPC ... G06F 3/04817; G06F 3/0482; G06F 3/0484
See application file for complete search history.

(56) References Cited

U.S. PATENT DOCUMENTS 9,891,787 B2 * 2/2018 Yoon .................... G06F 3/04817
2012/0036460 A1 2/2012 Cieplinski et al.
(Continued)

FOREIGN PATENT DOCUMENTS

CN 103500050 A 1/2014
CN 103616980 A 3/2014
(Continued)

OTHER PUBLICATIONS

International Search Report of International Application No. PCT/CN2020/080677 dated Jun. 23, 2020.
(Continued)

*Primary Examiner* — Mong-Shune Chung
(74) *Attorney, Agent, or Firm* — IP & T Group LLP

(57) ABSTRACT

An object processing method includes: receiving a first input of a user, the first input being an input of a first object in a first page by the user, objects in the first page being in an editable state; and in response to the first input, moving the first object to a first folder, the first folder being a folder indicated by a first folder icon. The first file folder iron being any one of: a folder icon in a second page, a folder icon corresponding in a first control to the first input and a folder icon in a first task window corresponding to the first input, the first page and the second page being pages on different screens of a terminal device, the first control being a control displayed in the first page, the first task window being a task window displayed in the first page.

17 Claims, 15 Drawing Sheets

(51) Int. Cl.
  *G06F 3/0482* (2013.01)
  *G06F 3/0488* (2022.01)

(56) References Cited

U.S. PATENT DOCUMENTS

| | | | |
|---|---|---|---|
| 2012/0304084 A1* | 11/2012 | Kim | G06F 3/0488 715/762 |
| 2014/0075354 A1 | 3/2014 | Ko | |
| 2014/0165006 A1* | 6/2014 | Chaudhri | H04N 7/15 715/835 |
| 2015/0212691 A1 | 7/2015 | Wang et al. | |
| 2017/0277380 A1* | 9/2017 | Shan | G06F 3/04817 |
| 2017/0336944 A1* | 11/2017 | Liu | G06F 3/04883 |
| 2018/0095653 A1 | 4/2018 | Hasek | |

FOREIGN PATENT DOCUMENTS

| | | |
|---|---|---|
| CN | 104238877 A | 12/2014 |
| CN | 104793848 A | 7/2015 |
| CN | 104866179 A | 8/2015 |
| CN | 107193438 A | 9/2017 |
| CN | 107562323 A | 1/2018 |
| CN | 107861784 A | 3/2018 |
| CN | 107918510 A | 4/2018 |
| CN | 108196754 A | 6/2018 |
| CN | 108710456 A | 10/2018 |
| CN | 109213396 A | 1/2019 |
| CN | 110231897 A | 9/2019 |
| EP | 2256611 A2 | 12/2010 |
| EP | 2527967 A2 | 11/2012 |
| EP | 2960783 A1 | 12/2015 |

OTHER PUBLICATIONS

Written Opinion of The International Searching Authority of International Application No. PCT/CN2020/080677 dated Jun. 23, 2020.
First Office Action of Priority Application No. 201910346516.4 dated Jun. 22, 2020.
Second Office Action of Priority Application No. 201910346516.4 dated Feb. 5, 2021.
Extended European Search Report issued by the European Patent Office dated May 25, 2022.

* cited by examiner

OBJECT PROCESSING METHOD AND TERMINAL DEVICE

This application is a Bypass Continuation Application of PCT/CN2020/080677 filed on Mar. 23, 2020, which claims priority to Chinese Patent Application No. 201910346516.4 filed on Apr. 26, 2019, which are incorporated herein by reference in their entirety.

TECHNICAL FIELD

Embodiments of the present disclosure relate to the technical field of communication, and in particular, to an object processing method and a terminal device.

BACKGROUND

Generally, when sorting the icons of the application programs (hereinafter referred to as application icons) in the terminal device, the user may press a certain application icon for a long time, so that the desktop where the terminal device is located is in an icon editing mode, and then the application icon is moved to a certain folder icon.

However, when the application icons sorted by the user and the folder icon are on different pages in the desktop of the terminal device, the user firstly needs to press the application icon for a long time to enable the desktop to enter the icon editing mode, then drag the application icon to find the target folder icon one by one in each page until the target folder icon is found, and move the application icon to the folder indicated by the target folder icon, which leads to a time-consuming process for the user to sort the application icons.

SUMMARY

According to a first aspect of the embodiment of the present disclosure, an object processing method is provided. The object processing method includes: receiving a first input of a user, wherein the first input is an input of a first object in a first page by the user, and objects in the first page is in an editable state; and moving the first object to a first folder in response to the first input, wherein the first folder is a folder indicated by a first folder icon, the first folder iron is any one of: a folder icon in a second page, a folder icon in a first control corresponding to the first input and a folder icon in a first task window corresponding to the first input, the first page and the second page are pages on different screens of the terminal device, the first control is a control displayed in the first page, the first task window is a task window displayed in the first page, and the first task window is configured to indicate a target page in a desktop of the terminal device.

According to a second aspect of the embodiment of the present disclosure, a terminal device is provided. The terminal device includes: a receiving unit and a moving unit. The receiving unit is configured to receive a first input of a user, wherein the first input is an input of a first object in a first page by the user, and objects in the first page is in an editable state. The moving unit is configured to move the first object to a first folder in response to the first input received by the receiving unit, wherein the first folder is a folder indicated by a first folder icon. The first folder iron may be any one of: a folder icon in a second page, a folder icon in a first control corresponding to the first input and a folder icon in a first task window corresponding to the first input, the first page and the second page are pages on different screens of the terminal device, the first control is a control displayed in the first page, the first task window is a task window displayed in the first page, and the first task window is configured to indicate a target page in a desktop of the terminal device.

According to a third aspect of the embodiment of the present disclosure, a terminal device is provided. The terminal device includes a processor, a memory, and a computer program stored in the memory and executable on the processor, wherein when the computer program is executed by the processor, steps of the object processing method as defined in the first aspect are implemented.

According to a fourth aspect, a non-transitory computer readable storage medium is provided. The non-transitory computer readable storage medium stores a computer program. When the computer program is executed by a processor, the steps of the object processing method as defined in the first aspect are implemented.

DETAILED DESCRIPTION OF EMBODIMENTS

Figure 1:
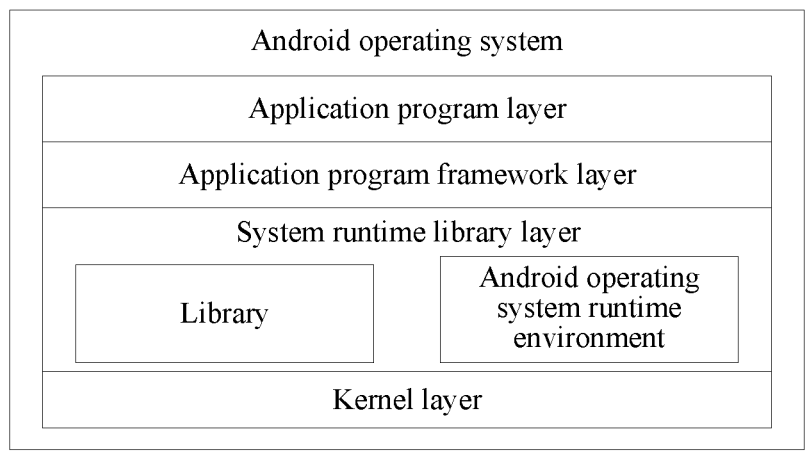
FIG. 1 is a schematic diagram of an architecture of an Android operating system according to an embodiment of the present disclosure.

The technical solutions in the embodiments of the present disclosure are described below clearly with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure shall fall within the protection scope of the present disclosure.

In the specification and claims of the present disclosure, the terms "first", "second", and so on are intended to distinguish between different objects, but do not describe a particular order of the objects. For example, the first input and the second input are used to distinguish between different inputs, but do not describe a particular order of the inputs.

In the description of the embodiment of the present application, unless otherwise specified, "a plurality of" means two or more. For example, a plurality of elements refer to two elements or more than two elements.

The term "and/or" in this specification describes an association relationship of associated objects, indicating that three relationships may exist. For example, a display panel and/or a backlight may indicate three cases: only the display panel exists, both the display panel and the backlight exist, and only the backlight exists. A character "/" in this specification indicates an "or" relationship between associated objects. For example, input/output indicates input or output.

In the embodiments of the present disclosure, the word such as "exemplary" or "for example" is used to represent giving an example, an illustration, or a description. Any embodiment or design scheme described as "exemplary" or "for example" in the embodiments of the present disclosure should not be construed as being more preferred or advantageous than other embodiments or design schemes. To be precise, the use of the term such as "exemplary" or "for example" is intended to present a related concept in a specific manner.

The embodiment of the present disclosure provides an object processing method and a terminal device. The terminal device may move the first object to the first folder (the first folder is a folder indicated by the first folder icon) according to the first input of the user (that is, the input of the first object in the first page by the user), wherein the first folder icon is any one of: the folder icon in the second page (the second page and the first page are located on different screens), the folder icon in the first control corresponding to the first input, and the folder icon in the first task window corresponding to the first input. Since the first folder icon and the first object are located on different screens, or the first folder icon is the folder icon in the first control displayed in the first page (that is, the first folder icon and the first object are located on the same page), or the first folder icon is the folder icon in the first task window displayed in the first page (that is, the first folder icon and the first object are located on the same page), the user directly performs first input on the first object, so that the terminal device can move the first object to the first folder, and the user does not need to drag the first object to find the first folder icon one by one in each page, thereby reducing the time consumed by the user to sort objects in the terminal device.

The object processing method and the terminal device provided by the embodiments of the present disclosure may be applied to the process of sorting the objects in the desktop of the terminal device. For example, they may be applied to the process of moving the objects in the desktop to one folder according to the input of the user.

The terminal device in the embodiments of the present disclosure may be a terminal device with an operating system. The operating system may be an Android operating system, an iOS operating system, or other possible operating systems, which is not specifically limited in the embodiments of the present disclosure.

Taking the Android operating system as an example, the following describes a software environment to which the object processing method provided in the embodiments of the present disclosure is applied.

As shown in FIG. 1, FIG. 1 is a schematic diagram of an architecture of a possible Android operating system according to an embodiment of the present disclosure. In FIG. 1, the architecture of the Android operating system includes 4 layers, namely: an application program layer, an application program framework layer, a system runtime library layer, and a kernel layer (for example, it may be the Linux kernel layer).

The application layer includes various application programs in the Android operating system (including system application programs and third-party application programs).

The application program framework layer is an application program framework, and the developer may develop some application programs based on the application program framework layer when following a development rule of the application program framework.

The system runtime library layer includes a library (also referred to as a system library) and a running environment of the Android operating system. The library mainly provides various resources required for the Android operating system. The running environment of the Android operating system is configured to provide a software environment for the Android operating system.

The kernel layer is an operating system layer of the Android operating system, which belongs to the bottom layer of software levels of the Android operating system. The kernel layer provides core system services and hardware-related drivers for the Android operating system based on the Linux kernel.

The Android operating system is taken as an example. In this embodiment of the present disclosure, based on the system architecture of the Android operating system shown in FIG. 1, developers may develop a software program that implements the object processing method provided in the embodiments of the present disclosure, so that the object processing method may be performed based on the Android operating system shown in FIG. 1. That is, a processor or the terminal device may run the software program in the Android operating system to implement the object processing method provided in this embodiment of the present disclosure.

The object processing method and the terminal device provided in the embodiments of the present disclosure are described in detail below through embodiments and application scenarios thereof with reference to the accompanying drawings.

At present in related art, when the application icons sorted by the user and the folder icon are on different pages in the desktop of the terminal device, the user firstly needs to press the application icon for a long time to enable the desktop to enter the icon editing mode, then drag the application icon to find the target folder icon one by one in each page until the target folder icon is found, and move the application icon to the folder indicated by the target folder icon, which leads to a time-consuming process for the user to sort the application icons.

Figure 2:
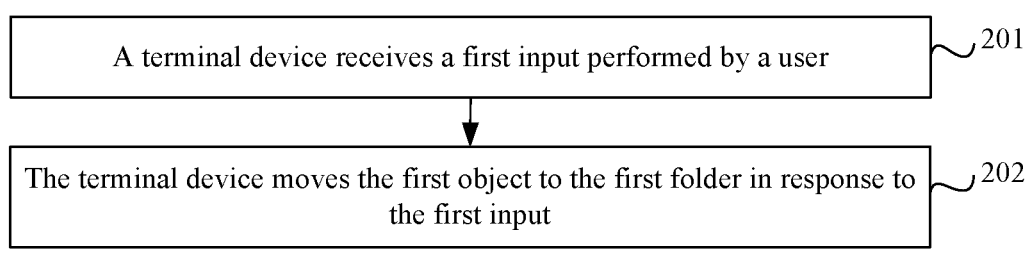
FIG. 2 is a first schematic diagram of an object processing method according to an embodiment of the present disclosure.

In order to solve the above technical problem, the embodiment of the present disclosure provides an object processing method. FIG. 2 shows a flowchart of an object processing method according to an embodiment of the present disclosure. The method may be applied to the terminal device with the Android operating system shown in FIG. 1. As shown in FIG. 2, the object processing method provided in the embodiment of the present disclosure may include a step 201 and a step 202.

Step 201: the terminal device receives a first input of a user.

In the embodiment of the present disclosure, the above first input is an input of a first object in a first page by the user, and objects in the first page are in an editable state.

It may be understood that in the embodiment of the present disclosure, after triggering the terminal device to start an object editable mode of the first page (that is, the objects in the first page are in the editable state), the user may perform first input on the first object in the first page.

It should be noted that in the embodiment of the present disclosure, the above object editable mode (or an editable state) may be understood as: the user may drag, click and download (delete/remove) the object in the first page.

Optionally, in the embodiment of the present disclosure, the user may perform long-press operation on any object in the first page, so that the object in the first page is in the editable state.

Optionally, in the embodiment of the present disclosure, the above first input may be a drag input of the first object in the first page by the user; or the above first input may be a click operation of the first object in the first page by the user, wherein the click operation may be a single-click operation, a double-click operation or an operation with continuous preset times, which may be specifically determined according to actual use requirements and is not limited by the embodiments of the present disclosure herein.

Optionally, in the embodiment of the present disclosure, the above first object may be icons of application programs or folder icons.

Optionally, in the embodiment of the present disclosure, the above first object may be icons of application programs or folder icons in the desktop of the terminal device.

Step 202: the terminal device moves the first object to the first folder in response to the first input.

In the embodiment of the present disclosure, the above first folder is a folder indicated by the first folder icon. The first folder iron may be any one of: a folder icon in a second page, a folder icon in a first control corresponding to the first input and a folder icon in a first task window corresponding to the first input, the first page and the second page are pages on different screens of the terminal device, the first control is a control displayed in the first page, the first task window is a task window displayed in the first page, and the first task window is configured to indicate a target page in a desktop of the terminal device.

Optionally, in the embodiments of the present disclosure, the terminal device may include single screen or a plurality of screens.

It should be noted that in the embodiment of the present disclosure, in a case that the terminal device includes a plurality of screens, the first page and the second page are pages on different screens in the plurality of screens. The task window may be understood as: a thumbnail of a page in the desktop of the terminal device. For example, the first task window may be understood as: a thumbnail of a target page in the desktop of the terminal device in the first page.

Optionally, in the embodiment of the present disclosure, the above first input may be a click operation of the first object in the first page by the user, and the first folder icon may be a folder icon in the second page.

Optionally, in the embodiment of the present disclosure, the second page includes at least one folder icon, and the first folder icon may be one of the at least one folder icon.

Optionally, in the embodiment of the present disclosure, the above first folder icon may be a folder icon which is randomly selected from the at least one folder icon in the second page by the terminal device; or the above first folder icon may be a folder icon which is selected from the at least one folder icon in the second page according to the input of the user (that is, a sixth input in the following embodiment).

Optionally, in the embodiment of the present disclosure, the above first folder icon may be one folder icon which is created by the terminal device in the second page according to the first input.

Optionally, in the embodiment of the present disclosure, the above second page may further include a folder creating control, and the folder creating control may be configured to create a folder icon in the second page by the user.

Optionally, in the embodiment of the present disclosure, the above first control includes at least one folder icon, the above first input may be an input of the user dragging the first object to one of the at least one folder icon in the first control, and the first folder icon is the one icon.

Optionally, in the embodiment of the present disclosure, the above first input may be an input of the user dragging the first object to a blank area (the blank area is an area in the first control except for an area where the folder icon is displayed) in the first control, and the first folder icon is a folder icon which is created by the terminal device in the first control according to the first input.

Optionally, in the embodiment of the present disclosure, in a case that the objects in the first page is in an editable state, the user may input any object in the first page (for example, long-press operation or click operation), so as to trigger the terminal device to display the first control in the first page.

Optionally, in the embodiment of the present disclosure, the first control includes at least one folder icon, and the user may perform a slide input in the first control (for example, left-slide input or right-slide input), so as to switch to view the folder icon in the first control.

Optionally, in the embodiment of the present disclosure, the display order of at least one folder icon included in the first control may be automatically adjusted by the terminal device.

Exemplarily, the folder icon selected by the user from the first control (for example, the user performs click operation on a certain folder icon in the first control) is located at the middle position of the first control, and the terminal device may sequence other folder icons (that is, the folder icons in the first control except for folder icons selected by the user) through a preset classification algorithm.

Optionally, in the embodiment of the present disclosure, the folder icon included in the second page is as same as the folder icon included in the first control, and the terminal device may move the first object to the first folder in the second page while moving the first object to the first folder (the first folder icon is the folder icon in the first control corresponding to the first input).

Optionally, in the embodiment of the present disclosure, the at least one folder icon in the second page may a folder icon added by the user, or may also be a folder icon which is selected by the terminal device from the desktop according to the folder icon in the desktop.

Optionally, in the embodiment of the present disclosure, the above first page includes at least one task window (the at least one task window includes a first task window), each task window includes at least one folder icon, the above first input may be an input of the user dragging the first object to one icon of the at least one folder icon in the first task window, and the first folder icon is the one icon.

Optionally, in the embodiment of the present disclosure, the above first input may be an input of the user dragging the first object to a blank area (the blank area is an area in the first task window except for an area where the folder icon is displayed) in the first task window, and the first folder icon is a folder icon which is created by the terminal device in the first task window according to the first input.

Optionally, in the embodiment of the present disclosure, the above second page may include at least one task window.

Figure 3A:
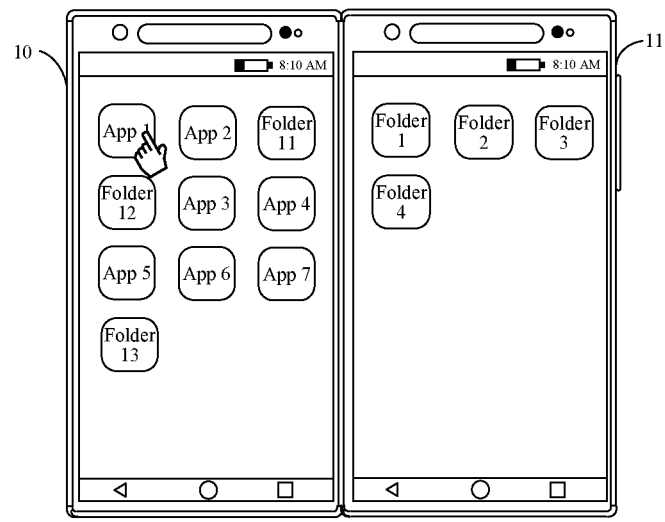
FIG. 3A is a first schematic diagram of an example of an interface of a mobile phone according to an embodiment of the present disclosure.
Figure 3B:
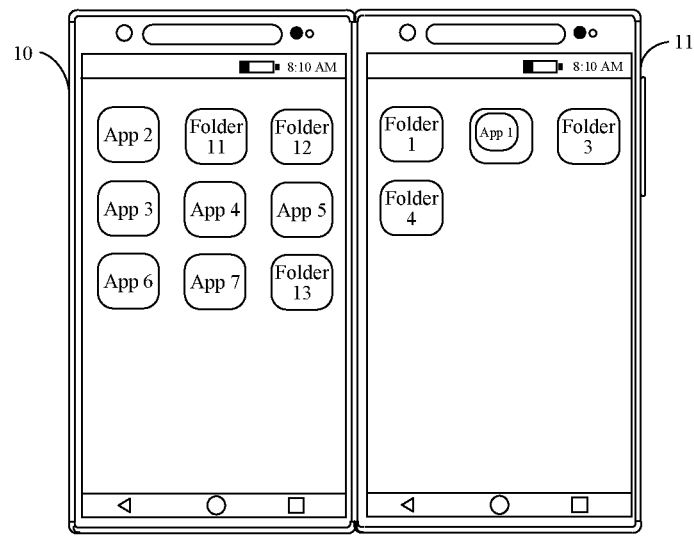
FIG. 3B is a second schematic diagram of an example of an interface of a mobile phone according to an embodiment of the present disclosure.

Exemplarily, the case where the terminal device is a mobile phone is taken as an example for description. As shown in FIG. 3A, the mobile phone includes two screens (such as a first screen 10 and a second screen 11); the first screen 10 displays a first page (the objects in the first page is in the editable state), the first page includes at least one object (such as an icon of the application program and the folder icon), the second screen 11 displays a second page, and the second page includes at least one folder icon (such as a folder icon 1 to a folder icon 4); and after the user performs first input on the icon 1 of the application program in the first page, as shown in FIG. 3B, the mobile phone may move the icon 1 of the application program to the folder indicated by the folder icon 2 in the second page.

Figure 4A:
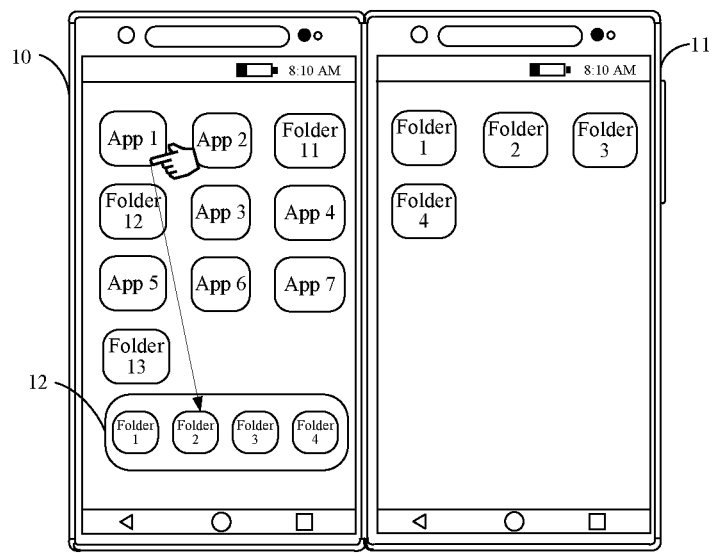
FIG. 4A is a third schematic diagram of an example of an interface of a mobile phone according to an embodiment of the present disclosure.
Figure 4B:
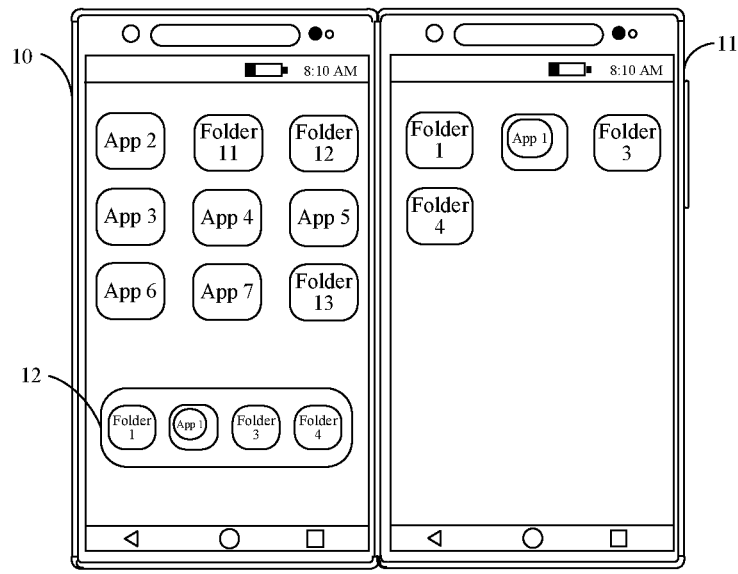
FIG. 4B is a fourth schematic diagram of an example of an interface of a mobile phone according to an embodiment of the present disclosure.

Exemplarily, as shown in FIG. 4A, the mobile phone includes two screens (such as a first screen 10 and a second screen 11), the first screen 10 displays a first page (the objects in the first page is in an editable state), the first page includes at least one object (such as the icon of the application program and the folder icon), the first page displays a first control 12, the first control 12 includes at least one folder (such as the folder icon 1 to the folder icon 4), the second screen 11 displays a second page, and the second page includes at least one folder icon (such as the folder icon 1 to the folder icon 4); and after the user performs first input on the icon 1 of the application program in the first page, as shown in FIG. 4B, the mobile phone may move the icon 1 of the application program to the folder indicated by the folder icon 2 in the first control 12 and move the icon 1 of the application program to the folder indicated by the folder icon 2 in the second page.

Figure 5A:
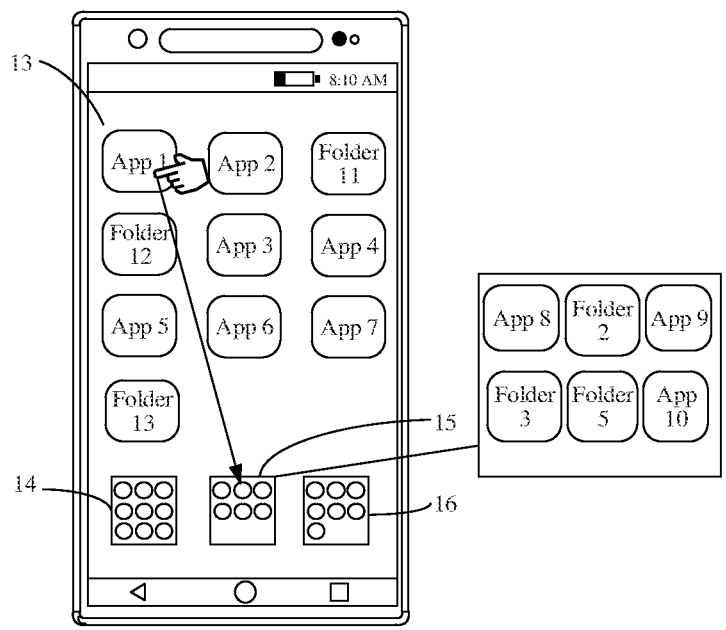
FIG. 5A is a fifth schematic diagram of an example of an interface of a mobile phone according to an embodiment of the present disclosure.
Figure 5B:
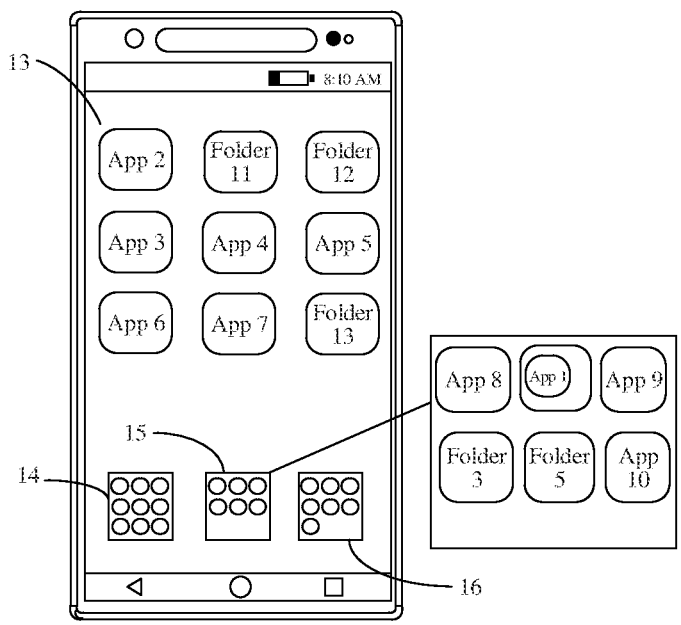
FIG. 5B is a sixth schematic diagram of an example of an interface of a mobile phone according to an embodiment of the present disclosure.

Exemplarily, as shown in FIG. 5A, the mobile phone displays a first page 13 (the objects in the first page 13 is in an editable state), the first page 13 includes at least one object (such as the icon of the application program and the folder icon), and the first page 13 further includes at least one task window (such as a task window 14 to a task window 16, each task window includes at least one folder icon); and after the user performs first input on the icon 1 of the application program in the first page, as shown in FIG. 5B, the mobile phone may move the icon 1 of the application program to the folder indicated by the folder icon 2 in the task window 15.

The embodiment of the present disclosure provides an object processing method. The terminal device may move the first object to the first folder (the first folder is a folder indicated by the first folder icon) according to the first input of the user (that is, the input of the first object in the first page by the user), wherein the first folder icon is any one of: the folder icon in the second page (the second page and the first page are located on different screens), the folder icon in the first control corresponding to the first input, and the folder icon in the first task window corresponding to the first input. Since the first folder icon and the first object are located on different screens, or the first folder icon is the folder icon in the first control displayed in the first page (that is, the first folder icon and the first object are located on the same page), or the first folder icon is the folder icon in the first task window displayed in the first page (that is, the first folder icon and the first object are located on the same page), the user directly performs first input on the first object, so that the terminal device can move the first object to the first folder, and the user does not need to drag the first object to find the first folder icon one by one in each page, thereby reducing the time consumed by the user to sort objects in the terminal device.

Figure 6:
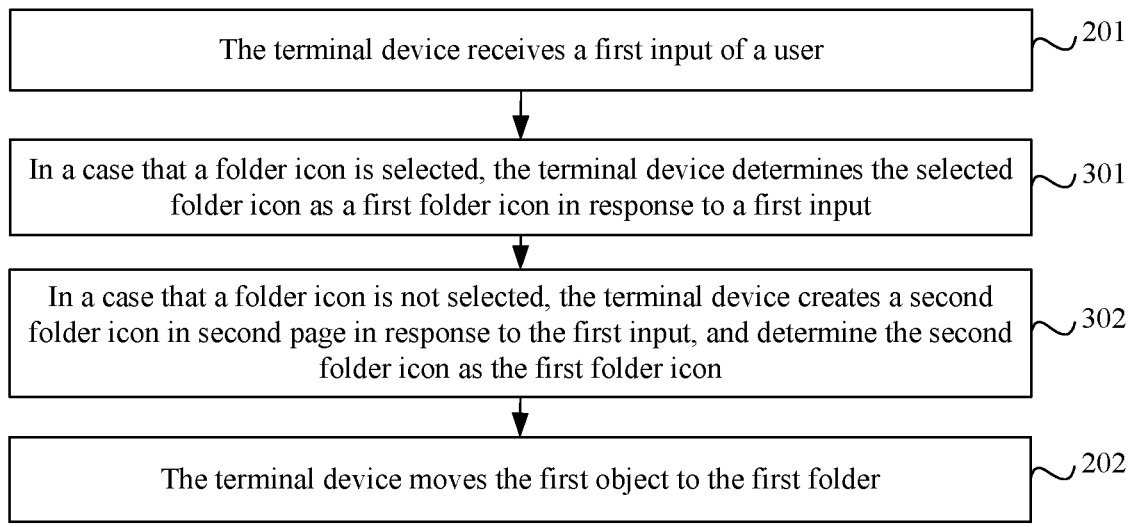
FIG. 6 is a second schematic diagram of an object processing method according to an embodiment of the present disclosure.

Optionally, in the embodiment of the present disclosure, the first folder icon is a folder icon in the second page. Referring to FIG. 2, as shown in FIG. 6, before the above step 202 "moving the first object to the first folder", the object processing method provided in the embodiment of the present disclosure may further include the following step 301 or step 302.

Step 301: in a case that a folder icon is selected, the terminal device determines the selected folder icon as a first folder icon in response to a first input.

Optionally, in the embodiment of the present disclosure, before the above step 201, the object processing method provided in the embodiment of the present disclosure may further include the following step 401 or step 402.

Step 401: the terminal device receives a sixth input of a user.

In the embodiment of the present disclosure, the above sixth input is a selection input of the user on the folder icon in the second page.

Optionally, in the embodiment of the present disclosure, the above sixth input may be a click operation of the user on the folder icon in the second page. The click operation may be a single-click operation, a double-click operation or an operation with continuous preset times, which may be specifically determined according to actual use requirements and is not limited by the embodiments of the present disclosure herein.

Optionally, in the embodiment of the present disclosure, if the terminal device detects the sixth input (such as click operation) of the user on the folder icon in the second page, or detects that any folder in the folder indicated by the folder icon in the second page is in an expanded state, the terminal device may determine that the folder icon is selected.

Optionally, in the embodiment of the present disclosure, after the user performs selection input on the folder icon in the second page, the terminal device may display an interface after the folder indicated by the folder icon is expanded.

Step 402: the terminal device selects the folder icon in the second page in response to the sixth input.

It may be understood that the terminal device may determine the folder icon as the first folder icon according to the selection input of the user on the folder icon in the second page.

Figure 7:
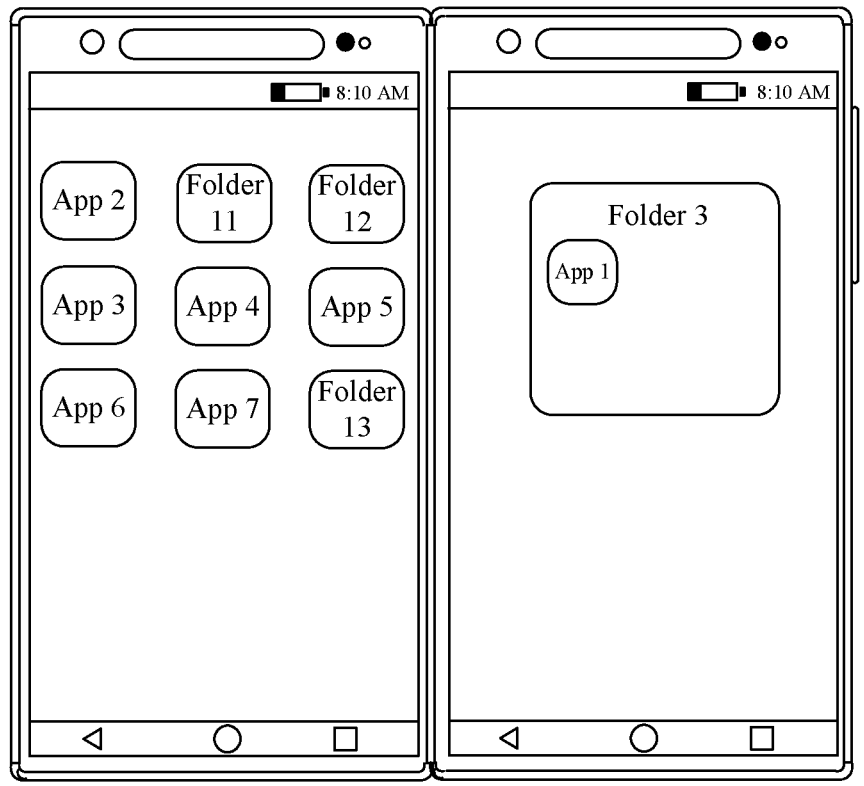
FIG. 7 is a seventh schematic diagram of an example of an interface of a mobile phone according to an embodiment of the present disclosure.

Exemplarily, referring to FIG. 3A, after the user perform sixth input on the folder icon 3 in the second page, as shown in FIG. 7, the second page displays the interface after the folder indicated by the folder icon 3 is expanded; and after the user performs first input on the icon 1 of the application program in the first page, the icon 1 of the application program is moved to the folder indicated by the folder icon 3.

Step 302: in a case that a folder icon is not selected, the terminal device creates a second folder icon in second page in response to the first input, and determine the second folder icon as the first folder icon.

Optionally, in the embodiment of the present disclosure, if the terminal device does not detect any operation (such as click operation) of the user on the folder icon in the second page, or detects that the folders indicated by the folder icon in the second page are in an unexpanded state, the terminal device may determine that the folder icon is not selected.

It may be understood that the above first folder icon may be a folder icon selected by the user through the sixth input, or may be a folder icon created by the terminal device according to the first input.

It should be noted that in the embodiment of the present disclosure, in a case that the terminal device performs the above step 301 or step 302, the above step 202 is: the terminal device moves the first object to the first folder.

In the embodiment of the present disclosure, the terminal device may determine the first folder icon from the second page according to whether the folder icon in the second page is selected, so that the user can trigger the terminal device to move the first object to the first folder.

Figure 8:
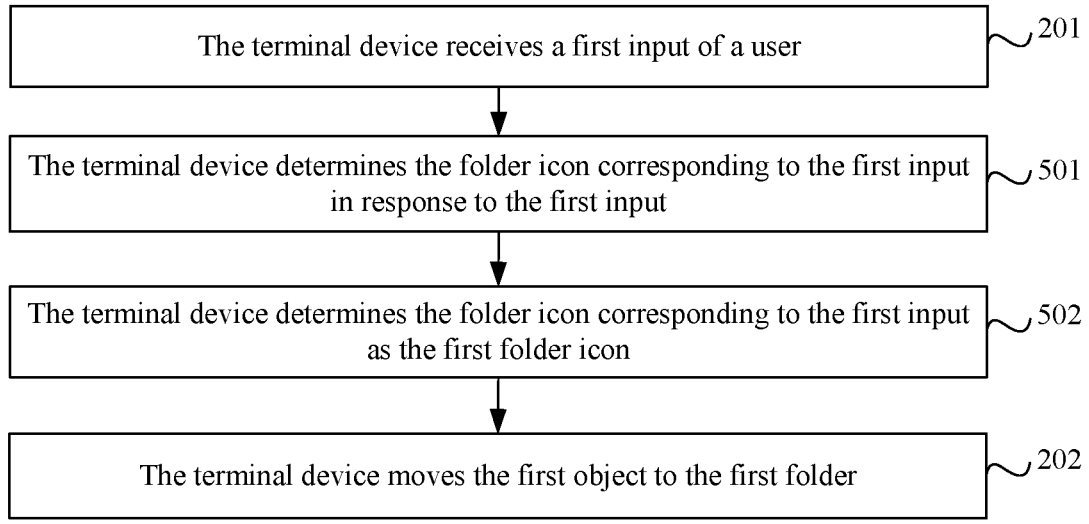
FIG. 8 is a third schematic diagram of an object processing method according to an embodiment of the present disclosure.

Optionally, in the embodiment of the present disclosure, the above first folder icon is a folder icon in the first control corresponding to the first input, or a folder icon in the first task window corresponding to the first input. Referring to FIG. 2, as shown in FIG. 8, before the above step 202 "moving the first object to the first folder", the object processing method provided in the embodiment of the present disclosure may further include the following step 501 and step 502.

Step 501: the terminal device determines the folder icon corresponding to the first input in response to the first input.

Optionally, in the embodiment of the present disclosure, before the first input is received, the first page includes at least one folder icon, and the first folder icon may be a folder icon selected from at least one folder icon through the first input.

Optionally, in the embodiment of the present disclosure, the above first folder icon may be a folder icon created by the terminal device in the first page according to the first input.

It should be noted that the description of determining the folder icon corresponding to the first input in the step 501 may be referenced to the related description in the step 202 in the above embodiments, which is not elaborated herein.

Step 502: the terminal device determines the folder icon corresponding to the first input as the first folder icon.

It should be noted that in the embodiment of the present disclosure, in a case that the terminal device performs the above step 501 and step 502, the above step 202 is: the terminal device moves the first object to the first folder.

In the embodiment of the present disclosure, the terminal device may determine the folder icon corresponding to the first input as the first folder icon, so that the user can trigger the terminal device to move the first object to the first folder.

Figure 9:
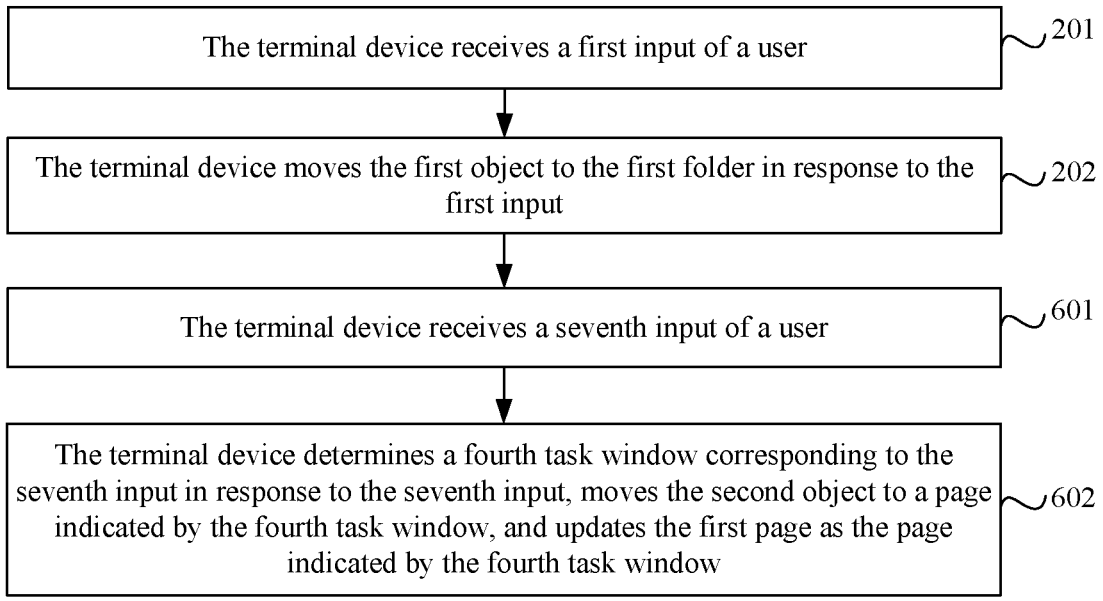
FIG. 9 is a fourth schematic diagram of an object processing method according to an embodiment of the present disclosure.

Optionally, in the embodiment of the present disclosure, the first page includes at least one task window, and each task window is configured to indicate one page in the desktop of the terminal device. Referring to FIG. 2, as shown in FIG. 9, after the above step 202, the object processing method provided in the embodiment of the present disclosure may further include the following step 601 and step 602.

Step 601: the terminal device receives a seventh input of a user.

In the embodiment of the present disclosure, the above seventh input is an input of the user on the second object in the first page.

Optionally, in the embodiment of the present disclosure, the above second object may be icons of application programs or folder icons.

Optionally, in the embodiment of the present disclosure, the above second object may be icons of application programs or folder icons in the desktop of the terminal device.

Optionally, in the embodiment of the present disclosure, the above seventh input may be a drag input of the user on the second object.

Optionally, in the embodiment of the present disclosure, the above seventh input may include two sub-inputs (such as a first sub-input and a second sub-input), wherein the first sub-input is an input of the user dragging the second object to one task window of at least one task window, the second sub-input is a press input on the second object, and a duration of the press input is greater than or equal to a preset duration.

It should be noted that the first sub-input and the second sub-input may be a continuous input. "Continuous" may be understood that there is no other input between the two inputs, and/or there is not time interval between the two inputs.

Optionally, in the embodiment of the present disclosure, the above seventh input may be an input of the user dragging the second object to an area between any two task windows in the first page.

Step 602: the terminal device determines a fourth task window corresponding to the seventh input in response to the seventh input, moves the second object to a page indicated by the fourth task window, and updates the first page as the page indicated by the fourth task window.

Optionally, in the embodiment of the present disclosure, before the seventh input is received, the first page includes at least one task window, and the fourth task window may be a task window selected from at least one task window through the seventh input.

It may be understood that if the seventh input is an input of the user dragging the second object to one task window of at least one task window, the one task window is the fourth task window.

Optionally, in the embodiment of the present disclosure, the fourth task window may be a task window created by the terminal device in the first page according to the seventh input.

It may be understood that if the seventh input is an input of the user dragging the second object to an area between any two task windows in the first page, the fourth task window is a task window created by the terminal device in the first page.

Optionally, in the embodiment of the present disclosure, after the terminal device updates the first page as a page indicated by the fourth task window, the user may also continuously input to trigger the terminal device to restore the previous first page.

Figure 10:
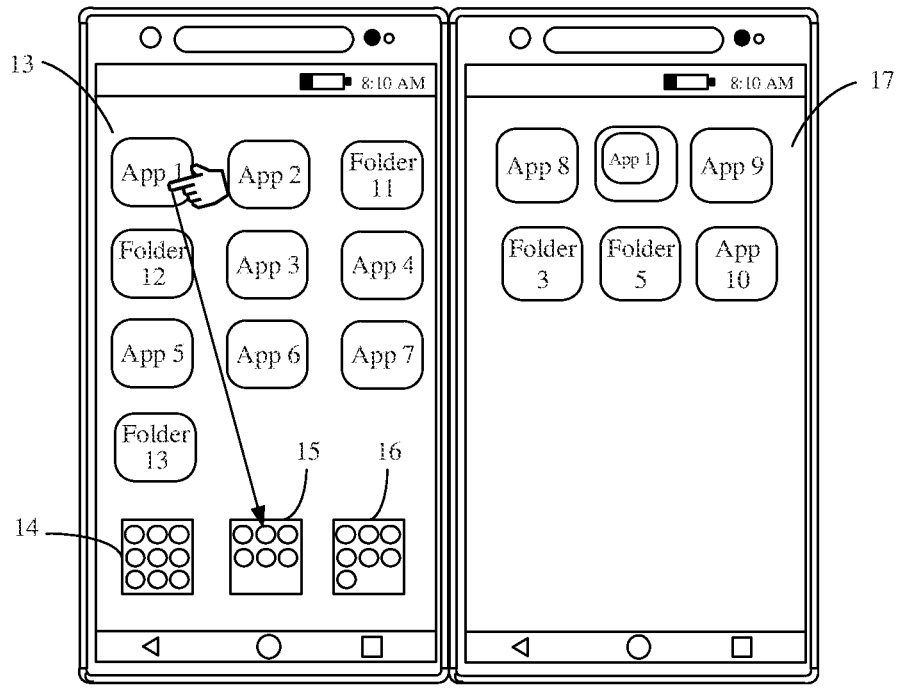
FIG. 10 is an eighth schematic diagram of an example of an interface of a mobile phone according to an embodiment of the present disclosure.

Exemplarily, referring to FIG. 5A, after the user performs seventh input for the second object (such as the icon 1 of the application program) in the first page 13 and the task window 15, as shown in FIG. 10, the mobile phone moves the icon 1 of the application program to a page 17 indicated by the task window 15, and displays the page 17 indicated by the task window 15.

In the embodiment of the present disclosure, the terminal device may rapidly move the second object to a page indicated by the fourth task window according to the seventh input of the user, and rapidly display the page indicated by the fourth task window.

Figure 11:
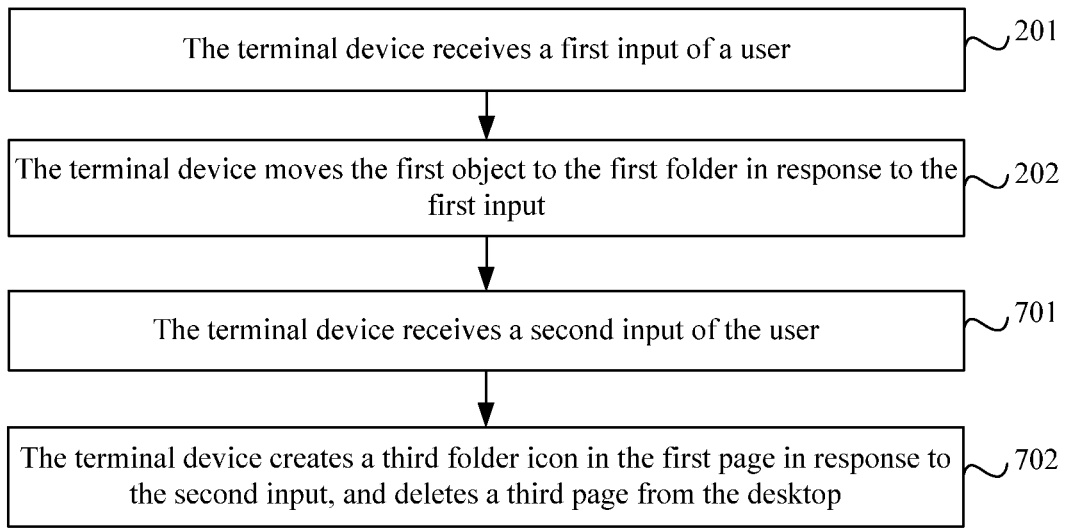
FIG. 11 is a fifth schematic diagram of an object processing method according to an embodiment of the present disclosure.

Optionally, in the embodiment of the present disclosure, the first page includes at least one task window, and each task window is configured to indicate one page in the desktop of the terminal device. Referring to FIG. 2, as shown in FIG. 11, after the above step 202, the object processing method provided in the embodiment of the present disclosure may further include the following step 701 and step 702.

Step 701: the terminal device receives second input of the user.

In the embodiment of the present disclosure, the above second input is an input of the user on the second task window, and the second task window is a task window of at least one task window.

It may be understood that the first task window is a task window of at least one task window.

Optionally, in the embodiment of the present disclosure, the above second input may be a drag input of the user on the second task window.

Optionally, in the embodiment of the present disclosure, the above second input may be an input of the user dragging the second task window to an upper area in the first page (the upper area is an area except for an area which displays at least one task window and a blank area between any task windows).

Step 702: in response to the second input, the terminal device creates a third folder icon in the first page and deletes a third page from the desktop.

In the embodiment of the present disclosure, the above third page is a page indicated by the second task window, and a folder indicated by a third folder icon includes all icons in the third page.

It may be understood that when the terminal device creates the third folder icon in the first page, the terminal device may delete the second task window from the first page and delete the third page from the desktop.

Figure 12A:
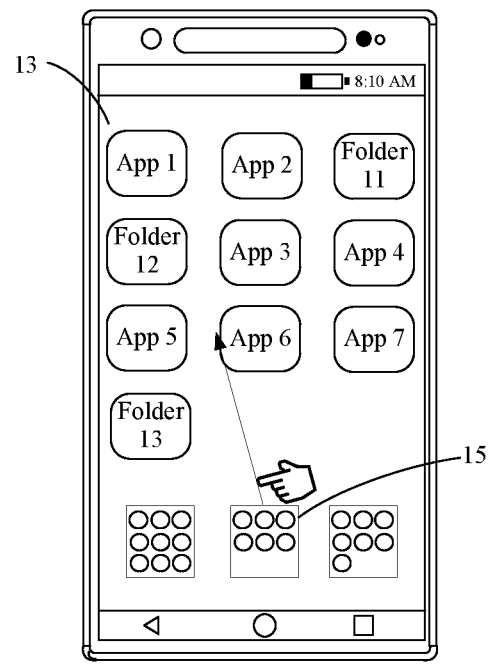
FIG. 12A is a ninth schematic diagram of an example of an interface of a mobile phone according to an embodiment of the present disclosure.
Figure 12B:
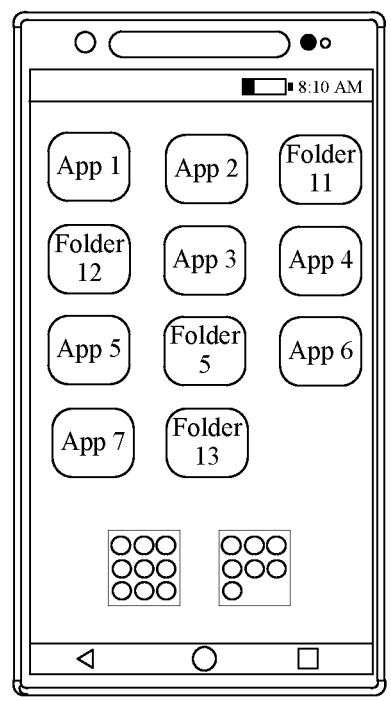
FIG. 12B is a tenth schematic diagram of an example of an interface of a mobile phone according to an embodiment of the present disclosure.

Exemplarily, referring to FIG. 5A, as shown in FIG. 12A, after the user drags the task window 15 to the upper area in the first page 13, as shown in FIG. 12B, the mobile phone creates a folder icon 5 in the first page 13 and deletes the task window 15 from the first page 13.

In the embodiment of the present disclosure, the terminal device may create the third folder icon in the first page according to the second input of the user so as to rapidly add all icons in one page to one folder (that is, the folder indicated by the third folder icon).

Optionally, in the embodiment of the present disclosure, the first page includes a first control, the first page further includes at least one task window, and each task window is configured to indicate one page in the desktop of the terminal device. After the above step 202, the object processing method provided in the embodiment of the present disclosure may further include the following step 801 and step 802.

Step 801: the terminal device receives a third input of the user.

In the embodiment of the present disclosure, the third input is an input of the user on the second task window, and the second task window is a task window of at least one task window.

Optionally, in the embodiment of the present disclosure, the above third input may be a drag input of the user on the second task window.

Optionally, in the embodiment of the present disclosure, the above third input may be an input of the user dragging the second task window to the first control.

Step 802: in response to the third input, the terminal device creates the third folder icon in the first control and deletes the third page from the desktop.

In the embodiment of the present disclosure, the above third page is a page indicated by the second task window, and a folder indicated by a third folder icon includes all icons in the third page.

It may be understood that when the terminal device creates the third folder icon in the first control, the terminal device may delete the second task window from the first page and delete the third page from the desktop.

In the embodiment of the present disclosure, the terminal device may create the third folder icon in the first control according to the third input of the user so as to rapidly add all icons in one page to one folder (that is, the folder indicated by the third folder icon).

Optionally, in the embodiment of the present disclosure, after the above step 801, the object processing method provided in the embodiment of the present disclosure may further include the following step 803.

Step 803: the terminal device creates a third folder icon in the second page in response to the third input.

Optionally, in the embodiment of the present disclosure, the terminal device may synchronously update the folder icon in the first control and the folder icon in the second page (that is, which folder icons in the first control, and which folders in the second page).

Certainly, after the user performs click operation on a certain folder icon in the first control, the terminal device may expand a folder indicated by the certain folder icon and expand the folder indicated by the certain folder icon in the second page.

It may be understood that the terminal device may also create a third folder icon in the second page while creating the third folder icon in the first control.

Figure 13A:
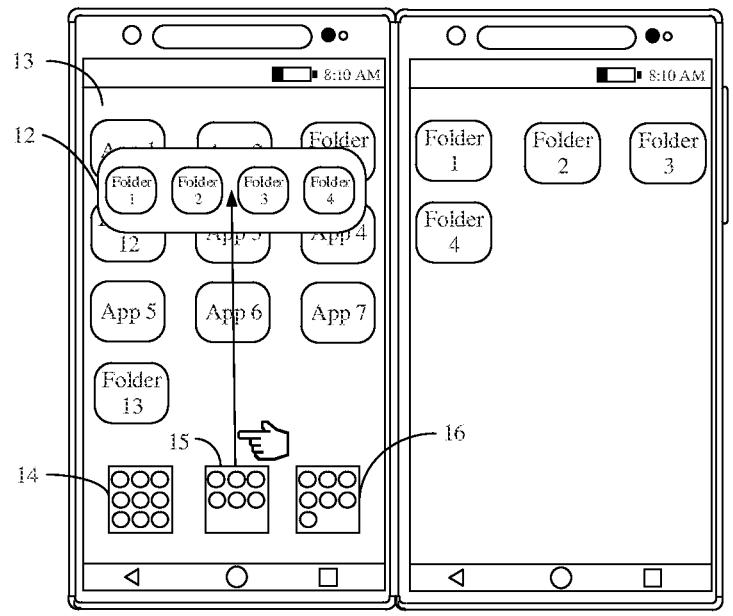
FIG. 13A is an eleventh schematic diagram of an example of an interface of a mobile phone according to an embodiment of the present disclosure.
Figure 13B:
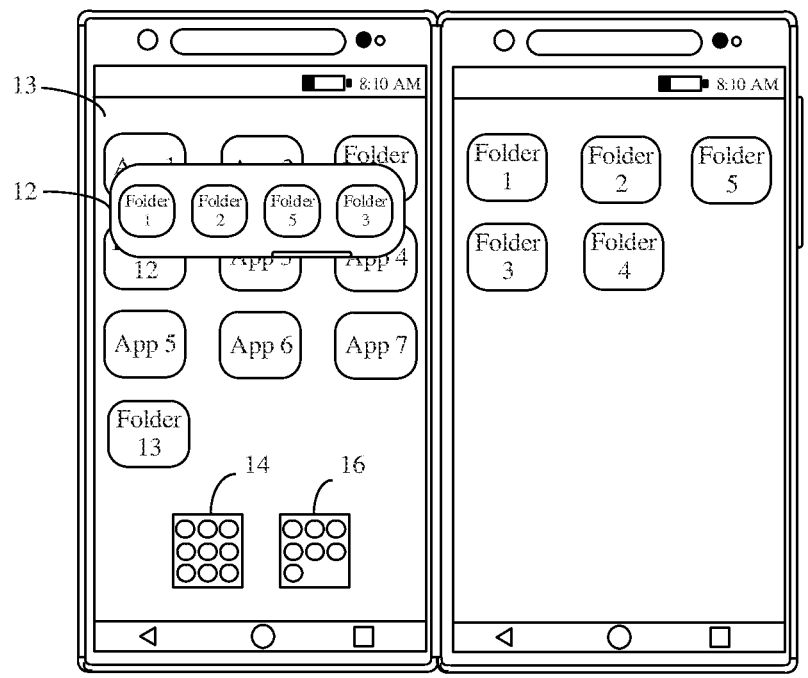
FIG. 13B is a twelfth schematic diagram of an example of an interface of a mobile phone according to an embodiment of the present disclosure.

Exemplarily, referring to FIG. 4A and FIG. 5A, as shown in FIG. 13A, the first page of the mobile phone displays a first control 12, and the first interface further includes at least one task window (such as a task window 14 to a task window 16). After the user drags the task window 15 to the first control 12, as shown in FIG. 13B, the mobile phone creates a folder icon 5 in the first control 12, creates the folder icon 5 in the second page and deletes the task window 15 from the first page 13.

Figure 14:
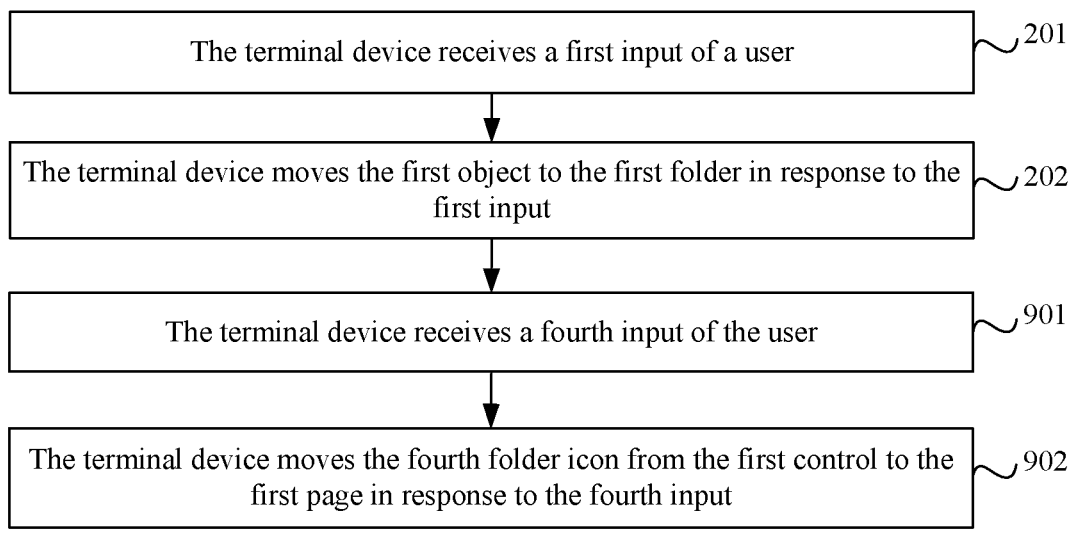
FIG. 14 is a sixth schematic diagram of an object processing method according to an embodiment of the present disclosure.

Optionally, in the embodiment of the present disclosure, the above first page includes the first control. Referring to FIG. 2, as shown in FIG. 14, after the above step 202, the object processing method provided in the embodiment of the present disclosure may further include the following step 901 and step 902.

Step 901: the terminal device receives a fourth input of the user.

In the embodiment of the present disclosure, the above fourth input is an input of the user on the fourth folder icon in the first control.

Optionally, in the embodiment of the present disclosure, the above fourth input may be a drag input of the user on the fourth folder icon in the first control.

Optionally, in the embodiment of the present disclosure, the above fourth input may be an input of the user dragging the fourth folder icon in the first control to the first page.

Step 902: the terminal device moves the fourth folder icon from the first control to the first page in response to the fourth input.

It may be understood that after the terminal device moves the fourth folder icon from the first control the first page, the first control does not include the fourth folder icon.

Optionally, in the embodiment of the present disclosure, the terminal device moves the fourth folder icon from the first control to the first page and deletes the fourth folder icon from the second page.

Figure 15A:
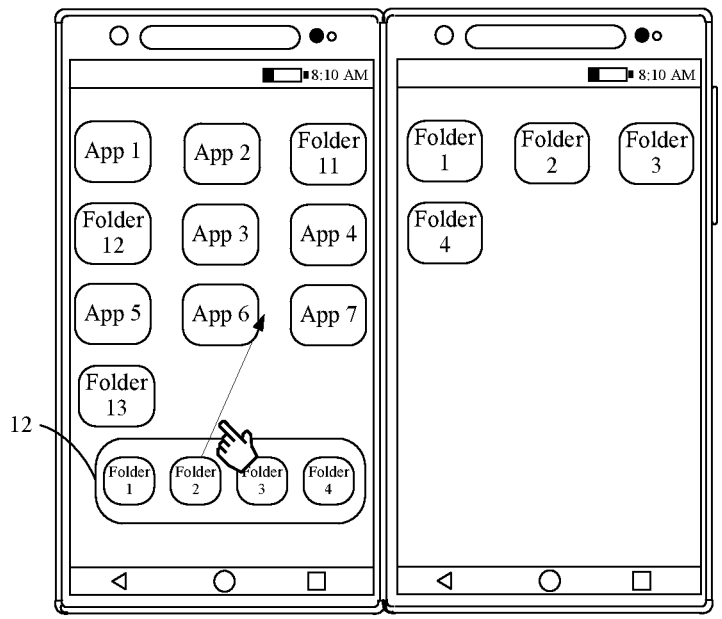
FIG. 15A is a thirteenth schematic diagram of an example of an interface of a mobile phone according to an embodiment of the present disclosure.
Figure 15B:
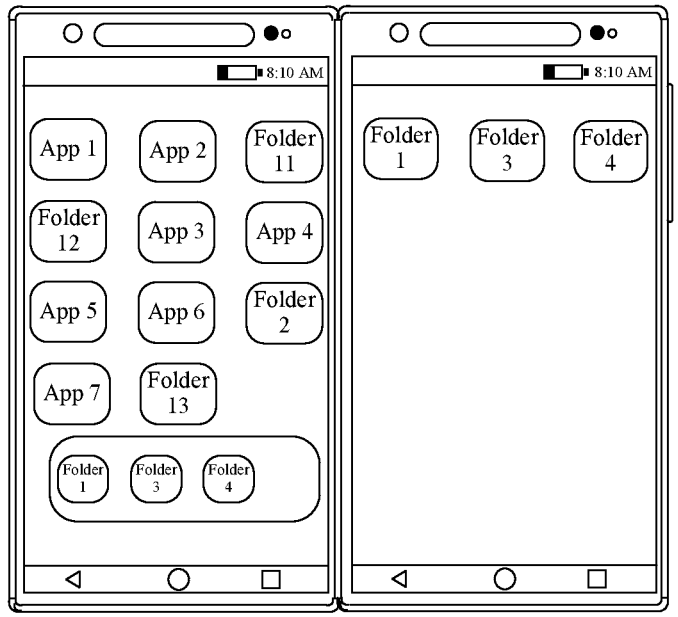
FIG. 15B is a fourteenth schematic diagram of an example of an interface of a mobile phone according to an embodiment of the present disclosure.

Exemplarily, referring to FIG. 4A, as shown in FIG. 15A, after the user performs fourth input on the folder icon 2 in the first control 12, as shown in FIG. 15B, the mobile phone displays the folder icon 2 (at this time, the first control 12 does not include the folder icon 2) in the first page, and deletes the folder icon 2 from the second page.

In the embodiment of the present disclosure, the terminal device may move the fourth folder icon from the first control to the first page so as to rapidly move folder icons in other pages to the first page.

Figure 16:
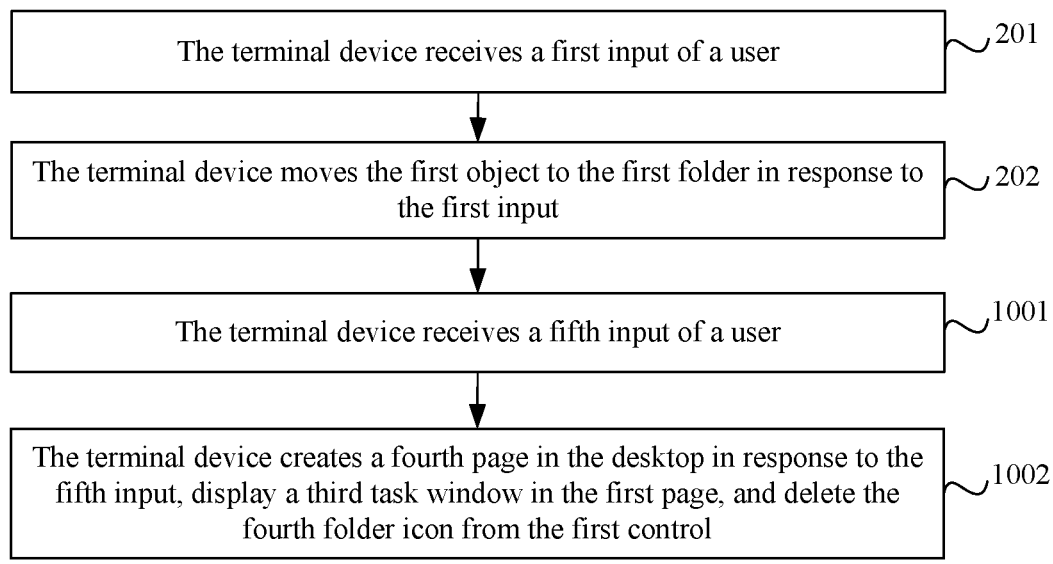
FIG. 16 is a seventh schematic diagram of an object processing method according to an embodiment of the present disclosure.

Optionally, in the embodiment of the present disclosure, the first page includes a first control, the first page further includes at least one task window, and each task window is configured to indicate one page in the desktop of the terminal device. Referring to FIG. 2, as shown in FIG. 16, after the above step 202, the object processing method provided in the embodiment of the present disclosure may further include the following step 1001 and step 1002.

Step 1001: the terminal device receives a fifth input of the user.

In the embodiment of the present disclosure, the above fifth input is an input of the user on the fourth folder icon in the first control.

Optionally, in the embodiment of the present disclosure, the above fifth input may be a drag input of the user on the fourth folder icon in the first control.

Optionally, in the embodiment of the present disclosure, the above fifth input may be an input of the user dragging the fourth folder icon in the first control to an area between any two task windows in the first page.

Step 1002: in response to the fifth input, the terminal device creates a fourth page in the desktop, display a third task window in the first page, and delete the fourth folder icon from the first control.

In the embodiment of the present disclosure, the above third task window is configured to indicate a fourth page, the fourth page includes all icons in a second folder, and the second folder is a folder indicated by the fourth folder icon.

In the embodiment of the present disclosure, the user may perform fifth input on the fourth folder icon in the first control, so that the terminal device may rapidly create a fourth page and add the fourth folder icon in the fourth page.

Optionally, in the embodiment of the present disclosure, the first page includes at least one task window, and each task window is configured to indicate one page in the desktop of the terminal device. The object processing method provided in the embodiment of the present disclosure may include the following step 1101 and step 1102.

Step 1101: the terminal device receives a seventh input of a user.

Step 1102: the terminal device determines a fourth task window corresponding to the seventh input in response to the seventh input, moves the second object to a page indicated by the fourth task window, and updates the first page as the page indicated by the fourth task window.

It should be noted that the description of the step 1101 and the step 1102 may be referenced to the description of the step 601 and the step 602 in the above embodiment, which is not elaborated herein.

Optionally, in the embodiment of the present disclosure, the first page includes at least one task window, and each task window is configured to indicate one page in the desktop of the terminal device. The object processing method provided in the embodiment of the present disclosure may include the following step 1201 and step 1202.

Step 1201: the terminal device receives second input of the user.

Step 1202: in response to the second input, the terminal device creates a third folder icon in the first page and deletes a third page from the desktop.

It should be noted that the description of the step 1201 and the step 1202 may be referenced to the description of the step 701 and the step 702 in the above embodiment, which is not elaborated herein.

Optionally, in the embodiment of the present disclosure, the first page includes a first control, the first page further includes at least one task window, and each task window is configured to indicate one page in the desktop of the terminal device. The object processing method provided in the embodiment of the present disclosure may include the following step 1301 and step 1302.

Step 1301: The terminal device receives a third input of the user.

Step 1302: in response to the third input, the terminal device creates the third folder icon in the first control and deletes the third page from the desktop.

It should be noted that the description of the step 1301 and the step 1302 may be referenced to the description of the step 801 to the step 803 in the above embodiment, which is not elaborated herein.

Optionally, in the embodiment of the present disclosure, the first page includes the first control. The object processing method provided in the embodiment of the present disclosure may include the following step 1401 and step 1402.

Step 1401: the terminal device receives a fourth input of the user.

Step 1402: the terminal device moves the fourth folder icon from the first control to the first page in response to the fourth input.

It should be noted that the description of the step 1401 and the step 1402 may be referenced to the description of the step 901 and the step 902 in the above embodiment, which is not elaborated herein.

Optionally, in the embodiment of the present disclosure, the first page includes a first control, the first page further includes at least one task window, and each task window is configured to indicate one page in the desktop of the terminal device. The object processing method provided in the embodiment of the present disclosure may include the following step 1501 and step 1502.

Step 1501: the terminal device receives a fifth input of the user.

Step 1502: in response to the fifth input, the terminal device creates a fourth page in the desktop, display a third task window in the first page, and delete the fourth folder icon from the first control.

It should be noted that the description of the step 1501 and the step 1502 may be referenced to the description of the step 1001 and the step 1002 in the above embodiment, which is not elaborated herein.

It should be noted that in the embodiment of the present disclosure, FIG. 6, FIG. 8, FIG. 9, FIG. 11, FIG. 14 and FIG. 16 are all illustrated with reference to FIG. 2, and do not form any limitation to the embodiment of the present disclosure. It may be understood that during actual implementation, FIG. 6, FIG. 8, FIG. 9, FIG. 11, FIG. 14 and FIG. 16 may also be implemented with reference to any other combinable drawings.

Figure 17:
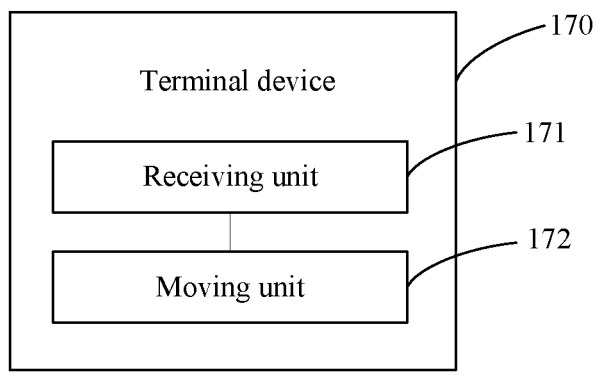
FIG. 17 is a first structural schematic diagram of a terminal device according to an embodiment of the present disclosure.

FIG. 17 shows a possible structural schematic diagram of a terminal device according to an embodiment of the present disclosure. As shown in FIG. 17, the terminal device 170 may include: a receiving unit 171 and a moving unit 172.

The receiving unit 171 is configured to receive a first input of a user, wherein the first input is an input of a first object in a first page by the user, and objects in the first page is in an editable state. The moving unit 172 is configured to move the first object to a first folder in response to the first input received by the receiving unit 171, wherein the first folder is a folder indicated by a first folder icon. The first folder iron may be any one of: a folder icon in a second page, a folder icon in a first control corresponding to the first input and a folder icon in a first task window corresponding to the first input, the first page and the second page are pages on different screens of the terminal device, the first control is a control displayed in the first page, the first task window is a task window displayed in the first page, and the first task window is configured to indicate a target page in a desktop of the terminal device.

Figure 18:
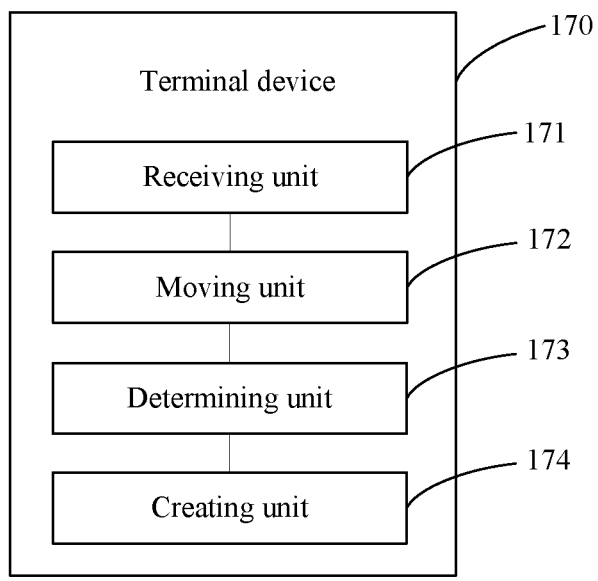
FIG. 18 is a second structural schematic diagram of a terminal device according to an embodiment of the present disclosure.

In a possible implementation manner, the above first folder icon is a folder icon in the second page. Referring to FIG. 17, as shown in FIG. 18, the terminal device 170 provided in the embodiment of the present disclosure may further include: a determining unit 173 and a creating unit 174. The determining unit 173 is configured to determine a selected folder icon as the first folder icon in a case that the folder icon is selected before the moving unit 172 moves the first object to the first folder. The creating unit 174 is configured to create a second folder icon in the second page in a case that a folder icon is not selected. The determining unit 173 is further configured to determine the second folder icon created by the creating unit 174 as the first folder icon.

Figure 19:
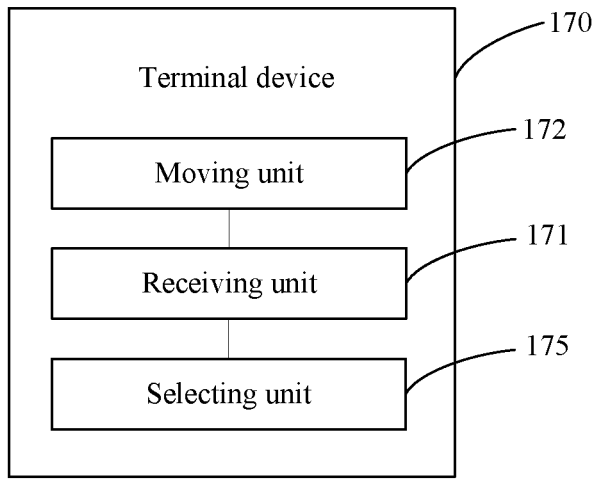
FIG. 19 is a third structural schematic diagram of a terminal device according to an embodiment of the present disclosure.

In a possible implementation manner, the receiving unit 171 is further configured to receive a sixth input of a user before receiving the first input of the user, wherein the sixth input is a selection input of the user on the folder icon in the second page. Referring to FIG. 18, as shown in FIG. 19, the terminal device 170 provided in the embodiment of the present disclosure may further include: a selecting unit 175. The selecting unit 175 is configured to select the folder icon in the second page in response to the sixth input received by the receiving unit 171.

Figure 20:
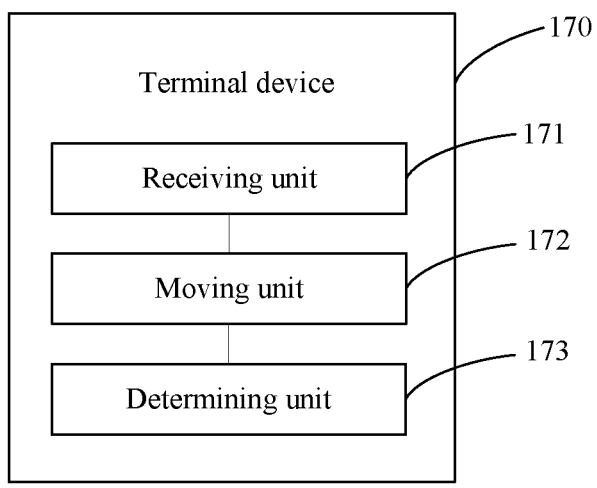
FIG. 20 is a fourth structural schematic diagram of a terminal device according to an embodiment of the present disclosure.

In a possible implementation manner, the above first folder icon is a folder icon in the first control corresponding to the first input, or a folder icon in the first task window corresponding to the first input. Referring to FIG. 17, as shown in FIG. 20, the terminal device 170 provided in the embodiment of the present disclosure may further include: a determining unit 173. The determining unit 173 is configured to determine the folder icon corresponding to the first input before the moving unit 172 moves the first object to the first folder, and determine the folder icon corresponding to the first input as the first folder icon.

In a possible implementation manner, before the first input is received, the first page includes at least one folder icon, and the first folder icon is a folder icon selected from at least one folder icon through the first input. Or the first folder icon is a folder icon created in the first page by the terminal device according to the first input.

Figure 21:
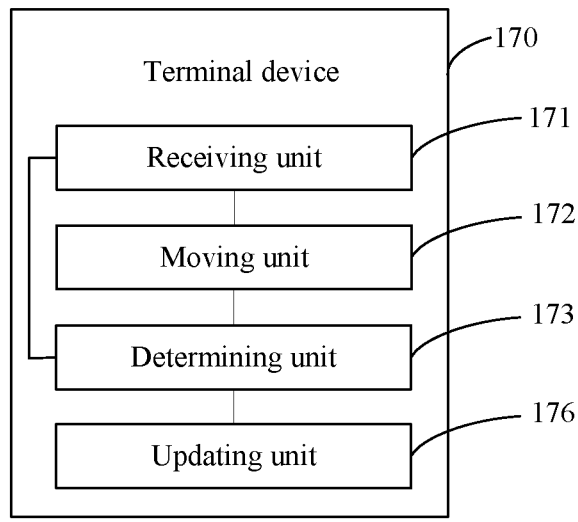
FIG. 21 is a fifth structural schematic diagram of a terminal device according to an embodiment of the present disclosure.

In a possible implementation manner, the above first page includes at least one task window, and each task window is configured to indicate one page in the desktop of the terminal device. The receiving unit 171 is further configured to receive a seventh input of the user, wherein the seventh input is an input of the user on the second object in the first page. Referring to FIG. 17, as shown in FIG. 21, the terminal device 170 provided in the embodiment of the present disclosure may further include: a determining unit 173 and an updating unit 176. The determining unit 173 is configured to determine a fourth task window corresponding to the seventh input in response to the seventh input received by the receiving unit 171. The moving unit 172 is further configured to move the second object to the page indicated by the fourth task window determined by the determining unit 173. The updating unit 176 is configured to update the first page as the page indicated by the fourth task window determined by the determining unit 173.

In a possible implementation manner, before the seventh input is received, the first page includes at least one task window, and the fourth task window is a task window selected from at least one task window through the seventh input. Or the fourth task window is a task window created by the terminal device in the first page according to the seventh input.

Figure 22:
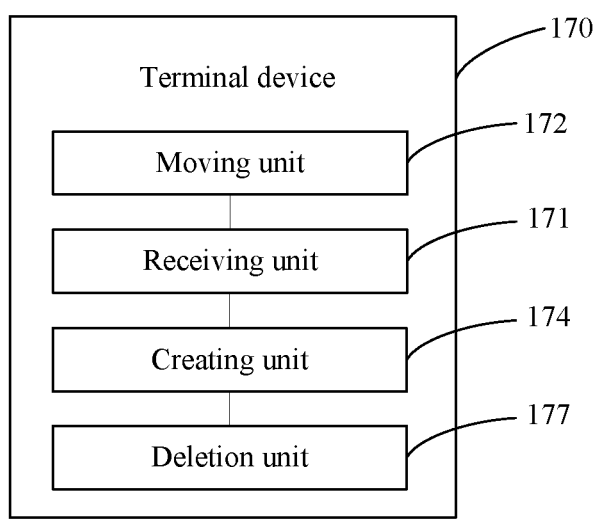
FIG. 22 is a sixth structural schematic diagram of a terminal device according to an embodiment of the present disclosure.

In a possible implementation manner, the above first page includes at least one task window, and each task window is configured to indicate one page in the desktop of the terminal device. The receiving unit 171 is further configured to receive a second input of a user, wherein the second input is an input of a second task window by the user, and the second task window is a task window of at least one task window. Referring to FIG. 17, as shown in FIG. 22, the terminal device 170 provided in the embodiment of the present disclosure may further include: a creating unit 174 and a deleting unit 177. The creating unit 174 is configured to create a third folder icon in the first page in response to the second input received by the receiving unit 171. The deleting unit 177 is configured to delete the third page from the desktop, the third page is a page indicated by the second task window, and the folder indicated by the third folder icon includes all icons in the third pages.

In a possible implementation manner, the first page includes a first control, the first page further includes at least one task window, and each task window is configured to indicate one page in the desktop of the terminal device. The receiving unit 171 is further configured to receive a third input of the user, wherein the third input is an input of the user on the second task window, and the second task window is a task window of at least one task window. The terminal device further includes: referring to FIG. 17, as shown in FIG. 22, the terminal device 170 provided in the embodiment of the present disclosure may further include: a creating unit 174 and a deleting unit 177. The creating unit 174 is configured to create a third folder icon in the first control in response to the third input received by the receiving unit 171. The deleting unit 177 is configured to delete the third page from the desktop, the third page is a page indicated by the second task window, and the folder indicated by the third folder icon includes all icons in the third pages.

In a possible implementation manner, the creating unit 174 is further configured to create a third folder icon in the second page in response to the third input received by the receiving unit 171.

In a possible implementation manner, the first page includes a first control. The receiving unit 171 is further configured to receive a fourth input of the user, wherein the fourth input is an input of the user on a fourth folder icon in the first control. The moving unit 172 is further configured to move the fourth folder icon from the first control to the first page in response to the fourth input received by the receiving unit 171.

Figure 23:
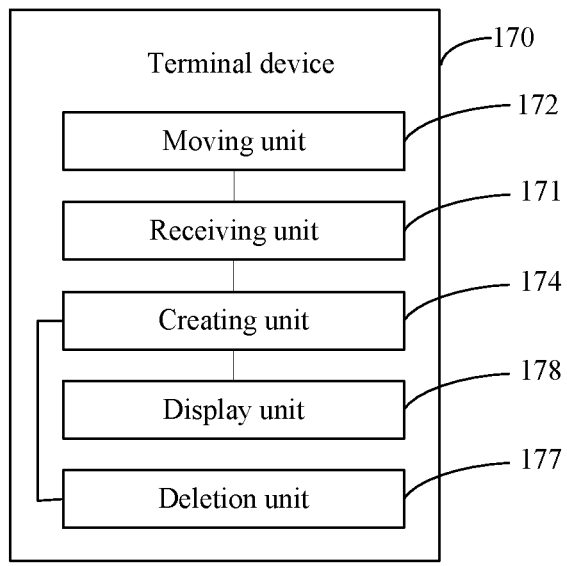
FIG. 23 is a seventh structural schematic diagram of a terminal device according to an embodiment of the present disclosure.

In a possible implementation manner, the first page includes a first control, the first page further includes at least one task window, and each task window is configured to indicate one page in the desktop of the terminal device. The receiving unit 171 is further configured to receive a fifth input of the user, wherein the fifth input is an input of the user on the fourth folder icon in the first control. Referring to FIG. 17, as shown in FIG. 23, the terminal device 170 provided in the embodiment of the present disclosure may further include: a creating unit 174, a display unit 178 and a deleting unit 177. The creating unit 174 is configured to create a fourth page in the desktop in response to the fifth input received by the receiving unit 171. The display unit 178 is configured to display a third task window in first page. The deleting unit 177 is configured to delete the fourth folder icon from the first control. The third task window is configured to indicate a fourth page, the fourth page includes all icons in a second folder, and the second folder is a folder indicated by the fourth folder icon.

The terminal device provided in the embodiment of the present disclosure can realize each process of implementing the terminal device in the above method embodiment. To avoid repetition, the detailed description is not elaborated herein.

The embodiment of the present disclosure provides a terminal device. Since the first folder icon and the first object are located on different screens, or the first folder icon is the folder icon in the first control displayed in the first page (that is, the first folder icon and the first object are located on the same page), or the first folder icon is the folder icon in the first task window displayed in the first page (that is, the first folder icon and the first object are located on the same page), the user directly performs first input on the first object, so that the terminal device can move the first object to the first folder, and the user does not need to drag the first object to find the first folder icon one by one in each page, thereby reducing the time consumed by the user to sort objects in the terminal device.

Figure 24:
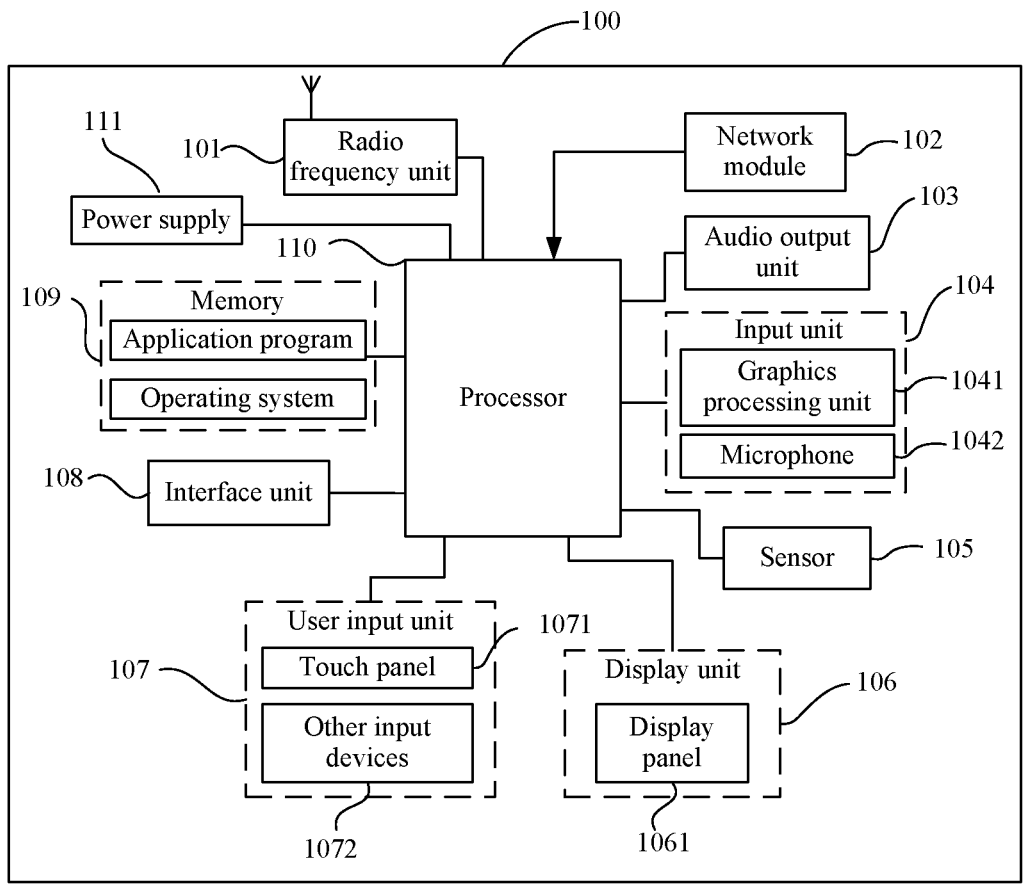
FIG. 24 is a hardware schematic diagram of a terminal device according to an embodiment of the present disclosure.

FIG. 24 is a schematic diagram of hardware of a terminal device implementing the embodiments of the present disclosure. As shown in FIG. 24, the terminal device 100 includes but is not limited to components such as a radio frequency unit 101, a network module 102, an audio output unit 103, an input unit 104, a sensor 105, a display unit 106, a user input unit 107, an interface unit 108, a memory 109, a processor 110, and a power supply 111.

It should be noted that those skilled in the art may understand that the terminal device structure shown in FIG. 24 does not constitute a limitation on the terminal device, and the terminal device may include more or fewer components than those shown in FIG. 24, or combine some components, or have different component arrangements. In the embodiment of the present disclosure, the terminal device includes but is not limited to a mobile phone, a tablet computer, a notebook computer, a palmtop computer, a vehicle-mounted terminal, a wearable device, a pedometer, or the like.

The user input unit 107 is configured to receive a first input of a user, wherein the first input is an input of a first object in a first page by the user, and objects in the first page is in an editable state.

The processor 110 is configured to move the first object to the first folder in response to the first input received by the user input unit 107, wherein the first folder is a folder indicated by the first folder icon; the first folder icon may be any one of: a folder icon in a second page, a folder icon in a first control corresponding to the first input and a folder icon in a first task window corresponding to the first input; the first page and the second page are pages on different screens of the terminal device; the first control is a control displayed in the first page; the first task window is a task window displayed in the first page; and the first task window is configured to indicate a target page in the desktop of the terminal device.

The embodiment of the present disclosure provides a terminal device. Since the first folder icon and the first object are located on different screens, or the first folder icon is the folder icon in the first control displayed in the first page (that is, the first folder icon and the first object are located on the same page), or the first folder icon is the folder icon in the first task window displayed in the first page (that is, the first folder icon and the first object are located on the same page), the user directly performs first input on the first object, so that the terminal device can move the first object to the first folder, and the user does not need to drag the first object to find the first folder icon one by one in each page, thereby reducing the time consumed by the user to sort objects in the terminal device.

It should be understood that, in this embodiment of the present disclosure, the radio frequency unit 101 may be configured to receive and transmit information or a signal in a call process. For example, after receiving downlink data from a base station, the radio frequency unit 101 transmits the downlink data to the processor 110 for processing. In addition, the radio frequency unit 101 transmits uplink data to the base station. Generally, the radio frequency unit 101 includes, but is not limited to, an antenna, at least one amplifier, a transceiver, a coupler, a low noise amplifier, and a duplexer, and the like. In addition, the radio frequency unit 101 may further communicate with a network and other devices through a wireless communications system.

The terminal device provides wireless broadband Internet access for a user by using the network module 102, for example, helping the user transmit and receive an email, browse a web page, and access streaming media.

The audio output unit 103 can convert audio data received by the radio frequency unit 101 or the network module 102 or stored in the memory 109 into an audio signal, and output the audio signal as sound. Moreover, the audio output unit 103 may further provide audio output (for example, call signal receiving sound and message receiving sound) related to a specific function performed by the terminal device 100. The audio output unit 103 includes a speaker, a buzzer, a telephone receiver, and the like.

The input unit 104 is configured to receive audio or video signals. The input unit 104 may include a graphics processing unit (GPU) 1041 and a microphone 1042. The graphics processing unit 1041 is used to process image data of a static picture or a video obtained by an image capturing device (for example, a camera) in a video capturing mode or an image capturing mode. A processed image frame may be displayed on the display unit 106. The image frame processed by the graphics processing unit 1041 may be stored in the memory 109 (or another storage medium) or transmitted via the radio frequency unit 101 or the network module 102. The microphone 1042 may receive sound and may process such sound into audio data. The processed audio data may be converted, in a call mode, into a format that may be transmitted to a mobile communication base station by using the radio frequency unit 101 for output.

The terminal device 100 further includes at least one sensor 105, such as an optical sensor, a motion sensor, and other sensors. For example, the light sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information inputted by a user or information provided to a user. The display unit 106 may include a display panel 1061, and may configure the display panel 1061 in the forms of a liquid crystal display (LCD), an organic light-emitting diode (OLED) and the like.

The user input unit 107 may be configured to receive input digit or character information, and generate key signal input related to user setting and function control of the terminal device. For example, the user input unit 107 includes a touch panel 1071 and another input device 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection device and a touch controller. The touch detection device detects a touch position of a user, detects a signal brought by a touch operation, and transmits the signal to the touch controller. The touch controller receives touch information from the touch detection apparatus, converts the touch information into contact coordinates, sends the contact coordinates to the processor 110, and receives and executes a command from the processor 110. In addition, the touch panel 1071 may be implemented by various types such as a resistive type, a capacitive type, an infrared ray type or a surface acoustic wave type. In addition to the touch panel 1071, the user input unit 107 may further include other input devices 1072. For example, the another input device 1072 may include but is not limited to a physical keyboard, a function key (such as a volume control key or an on/off key), a trackball, a mouse, and a joystick. Details are not described herein again.

Optionally, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. Although in FIG. 24, the touch panel 1071 and the display panel 1061 are configured as two independent components to implement input and output functions of the terminal device, in some embodiments, the touch panel 1071 and the display panel 1061 can be integrated to implement the input and output functions of the terminal device. Details are not limited herein.

The interface unit 108 is an interface for connecting an external apparatus to the terminal device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 may be configured to receive an input (for example, data information or power) from the external apparatus and transmit the received input to one or more elements in the terminal device 100, or transmit data between the terminal device 100 and the external device.

The memory 109 may be configured to store a software program and various data. The memory 109 may mainly include a program storage area and a data storage area. The program storage area may store an operating system, an application required for at least one function (for example, a sound playback function or an image playback function), and the like. The data storage area may store data (for example, audio data or an address book) or the like created based on use of the mobile phone. In addition, the memory 109 may include a high-speed random access memory, or may include a nonvolatile memory, for example, at least one disk storage device, a flash memory, or another volatile solid-state storage device.

The processor 110 is a control center of the terminal device, connects various parts of the entire terminal device by using various interfaces and circuits, and performs various functions of the terminal device and processes data by running or executing the software programs and/or the modules stored in the memory 109 and invoking data stored in the memory 109, so as to monitor the terminal device as a whole. The processor 110 may include one or more processing units. Optionally, the processor 110 may be integrated with an application processor and a modem processor. The application processor mainly processes an operating system, a user interface, an application program, and the like, and the modem processor mainly processes wireless communication. It may be understood that the above-mentioned modem processor may not be integrated in the processor 110.

The terminal device 100 may further include the power supply 111 (such as a battery) that supplies power to each component. Optionally, the power supply 111 may be logically connected to the processor 110 by using a power management system, to implement functions such as charging, discharging, and power consumption management by using the power management system.

In addition, the terminal device 100 includes some functional modules that are not shown. Details are not described herein.

Optionally, the embodiment of the present disclosure further provides a terminal device, including a processor 110 shown in FIG. 24, a memory 109, and a computer program that is stored in the memory 109 and that can run on the processor 110. When the computer program is executed by the processor 110, the processes of the foregoing method embodiment are implemented, and a same technical effect can be achieved. To avoid repetition, details are not described herein again.

The embodiments of the present disclosure further provide a non-transitory computer-readable storage medium. The non-transitory computer-readable storage medium stores a computer program, and when a processor executes the computer program, the processes of the foregoing method embodiment are implemented and the same technical effect can be achieved. To avoid repetition, details are not described herein again. The non-transitory computer readable storage medium includes a read-only memory (ROM) a random access memory (RAM), a magnetic disk, or an optical disc.

It should be noted that in this specification, the terms "comprise", "include" and any other variants thereof are intended to cover non-exclusive inclusion, so that a process, a method, an article, or an device that includes a series of elements not only includes these very elements, but may also include other elements not expressly listed, or also include elements inherent to this process, method, article, or device. In the absence of more restrictions, an element defined by the statement "including a . . . " does not exclude another same element in a process, method, article, or device that includes the element.

Based on the foregoing descriptions of the embodiments, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing a terminal device (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. An object processing method, applied to a terminal device, the method comprising:
receiving a first input of a user, wherein the first input is an input of a first object in a first page by the user, and objects in the first page is in an editable state, wherein the first page comprises at least one task window, and each task window is configured to indicate one page in the desktop of the terminal device;
moving the first object to a first folder in response to the first input, wherein the first folder is a folder indicated by a first folder icon, the first folder icon is any one of: a folder icon in a second page, a folder icon in a first control corresponding to the first input and a folder icon in a first task window corresponding to the first input, the first page and the second page are pages on different screens of the terminal device, the first control is a control displayed in the first page, the first task window is a task window displayed in the first page, and the first task window is configured to indicate a target page in a desktop of the terminal device;
receiving a second input of the user, wherein the second input is an input of a second task window by the user, and the second task window is a task window of the at least one task window; and
in response to the second input, creating a third folder icon in the first page and deleting a third page from the desktop, wherein the third page is a page indicated by the second task window, and a folder indicated by the third folder icon comprises all icons in the third page.

2. The method according to claim 1, wherein the first folder icon is the folder icon in the second page; and before the moving the first object to the first folder, the method further comprises:
in a case that a folder icon is selected, determining the selected folder icon as the first folder icon, and
in a case that a folder icon is not selected, creating a second folder icon in the second page and determining the second folder icon as the first folder icon.

3. The method according to claim 1, wherein before the first input is received, the first page comprises at least one folder icon; and the first folder icon is a folder icon selected from the at least one folder icon through the first input, or
the first folder icon is a folder icon created in the first page by the terminal device according to the first input.

4. The method according to claim 1, wherein the first page comprises the first control, the first page further comprises at least one task window, and each task window is configured to indicate one page in the desktop of the terminal device; and
the method further comprises:
receiving a third input of a user, the third input being an input of a second task window by the user, and the second task window being a task window of the at least one task window, and
in response to the third input, creating a third folder icon and deleting a third page from the desktop, the third page being a page indicated by the second task window, and a folder indicated by the third folder icon comprises all icons in the third page.

5. The method according to claim 4, further comprising:
creating the third folder icon in the second page in response to the third input.

6. The method according to claim 1, wherein the first page comprises the first control; and
the method further comprises:
receiving a fourth input of a user, the fourth input being an input of a fourth folder icon in the first control by the user, and
moving the fourth folder icon from the first control to the first page in response to the fourth input.

7. The method according to claim 1, wherein the first page comprises the first control, the first page further comprises at least one task window, and each task window is configured to indicate one page in the desktop of the terminal device; and
the method further comprises:
receiving a fifth input of a user, the fifth input being an input of a fourth folder icon in the first control by the user, and
in response to the fifth input, creating a fourth page in the desktop, displaying a third task window in the first page, and deleting the fourth folder icon from the first control,
the third task window being configured to indicate the fourth page, the fourth page comprising all icons in a second folder, and the second folder being a folder indicated by the fourth folder icon.

8. A terminal device, comprising a processor, a memory and a computer program stored in the memory and executable on the processor, wherein the computer program, when executed by the processor, causes the terminal device to perform:
receiving a first input of a user, wherein the first input is an input of a first object in a first page by the user, and objects in the first page is in an editable state, wherein the first page comprises at least one task window, and each task window is configured to indicate one page in the desktop of the terminal device;
moving the first object to a first folder in response to the first input, wherein the first folder is a folder indicated by a first folder icon, the first folder icon is any one of: a folder icon in a second page, a folder icon in a first control corresponding to the first input and a folder icon in a first task window corresponding to the first input, the first page and the second page are pages on different screens of the terminal device, the first control is a control displayed in the first page, the first task window is a task window displayed in the first page, and the first task window is configured to indicate a target page in a desktop of the terminal device;
receiving a second input of the user, wherein the second input is an input of a second task window by the user, and the second task window is a task window of the at least one task window; and
in response to the second input, creating a third folder icon in the first page and deleting a third page from the desktop, wherein the third page is a page indicated by the second task window, and a folder indicated by the third folder icon comprises all icons in the third page.

9. The terminal device according to claim 8, wherein the first folder icon is the folder icon in the second page; and the computer program, when executed by the processor, causes the terminal device to further perform:
in a case that a folder icon is selected, determining the selected folder icon as the first folder icon, and
in a case that a folder icon is not selected, creating a second folder icon in the second page and determining the second folder icon as the first folder icon.

10. The terminal device according to claim 8, wherein before the first input is received, the first page comprises at least one folder icon; and the first folder icon is a folder icon selected from the at least one folder icon through the first input, or
the first folder icon is a folder icon created in the first page by the terminal device according to the first input.

11. The terminal device according to claim 8, wherein the first page comprises the first control, the first page further comprises at least one task window, and each task window is configured to indicate one page in the desktop of the terminal device; and the computer program, when executed by the processor, causes the terminal device to further perform:
receiving a third input of a user, the third input being an input of a second task window by the user, and the second task window being a task window of the at least one task window, and
in response to the third input, creating a third folder icon and deleting a third page from the desktop, the third page being a page indicated by the second task window, and a folder indicated by the third folder icon comprises all icons in the third page.

12. The terminal device according to claim 8, wherein the first page comprises the first control; and the computer program, when executed by the processor, causes the terminal device to further perform:
receiving a fourth input of a user, the fourth input being an input of a fourth folder icon in the first control by the user, and
moving the fourth folder icon from the first control to the first page in response to the fourth input.

13. The terminal device according to claim 8, wherein the first page comprises the first control, the first page further comprises at least one task window, and each task window is configured to indicate one page in the desktop of the terminal device; and the computer program, when executed by the processor, causes the terminal device to further perform:
    receiving a fifth input of a user, the fifth input being an input of a fourth folder icon in the first control by the user, and
    in response to the fifth input, creating a fourth page in the desktop, displaying a third task window in the first page, and deleting the fourth folder icon from the first control,
    the third task window being configured to indicate the fourth page, the fourth page comprising all icons in a second folder, and the second folder being a folder indicated by the fourth folder icon.

14. A non-transitory computer readable storage medium, storing a computer program, wherein the computer program, when executed by a processor, causes the processor to perform:
    receiving a first input of a user, wherein the first input is an input of a first object in a first page by the user, and objects in the first page is in an editable state, wherein the first page comprises at least one task window, and each task window is configured to indicate one page in the desktop of the terminal device;
    moving the first object to a first folder in response to the first input, wherein the first folder is a folder indicated by a first folder icon, the first folder icon is any one of: a folder icon in a second page, a folder icon in a first control corresponding to the first input and a folder icon in a first task window corresponding to the first input, the first page and the second page are pages on different screens of the terminal device, the first control is a control displayed in the first page, the first task window is a task window displayed in the first page, and the first task window is configured to indicate a target page in a desktop of the terminal device;
    receiving a second input of the user, wherein the second input is an input of a second task window by the user, and the second task window is a task window of the at least one task window; and
    in response to the second input, creating a third folder icon in the first page and deleting a third page from the desktop, wherein the third page is a page indicated by the second task window, and a folder indicated by the third folder icon comprises all icons in the third page.

15. The non-transitory computer readable storage medium according to claim 14, wherein the first page comprises the first control, the first page further comprises at least one task window, and each task window is configured to indicate one page in the desktop of the terminal device; and the computer program, when executed by the processor, causes the processor to further perform:
    receiving a third input of a user, the third input being an input of a second task window by the user, and the second task window being a task window of the at least one task window, and
    in response to the third input, creating a third folder icon and deleting a third page from the desktop, the third page being a page indicated by the second task window, and a folder indicated by the third folder icon comprises all icons in the third page.

16. The non-transitory computer readable storage medium according to claim 14, wherein the first page comprises the first control; and the computer program, when executed by the processor, causes the processor to further perform:
    receiving a fourth input of a user, the fourth input being an input of a fourth folder icon in the first control by the user, and
    moving the fourth folder icon from the first control to the first page in response to the fourth input.

17. The non-transitory computer readable storage medium according to claim 14, wherein the first page comprises the first control, the first page further comprises at least one task window, and each task window is configured to indicate one page in the desktop of the terminal device; and the computer program, when executed by the processor, causes the processor to further perform:
    receiving a fifth input of a user, the fifth input being an input of a fourth folder icon in the first control by the user, and
    in response to the fifth input, creating a fourth page in the desktop, displaying a third task window in the first page, and deleting the fourth folder icon from the first control,
    the third task window being configured to indicate the fourth page, the fourth page comprising all icons in a second folder, and the second folder being a folder indicated by the fourth folder icon.

\* \* \* \* \*